United States Patent [19]
Sato

[11] Patent Number: 5,227,127
[45] Date of Patent: Jul. 13, 1993

[54] FILTERED VENTING SYSTEM FOR REACTOR CONTAINMENT VESSEL OF NUCLEAR POWER PLANT

[75] Inventor: Takashi Sato, Yokohama, Japan

[73] Assignee: Kabushiki Kaisha Toshiba, Kawasaki, Japan

[21] Appl. No.: 808,236

[22] Filed: Dec. 16, 1991

[30] Foreign Application Priority Data

Dec. 17, 1990 [JP] Japan .................... 3-402857

[51] Int. Cl.$^5$ .................................. G21C 19/42
[52] U.S. Cl. ..................... 376/313; 376/310; 376/309; 376/316
[58] Field of Search .......... 376/313, 310, 309, 283, 376/293, 314, 316; 976/DIG. 140, DIG. 299, DIG. 172

[56] References Cited
U.S. PATENT DOCUMENTS

| | | | |
|---|---|---|---|
| 3,865,688 | 2/1975 | Kleimola | 376/283 |
| 3,925,046 | 12/1975 | Hickey et al. | 55/387 |
| 4,863,677 | 9/1989 | Eckardt | 376/313 |
| 4,873,050 | 10/1989 | Eckardt | 376/283 |

Primary Examiner—Donald P. Walsh
Assistant Examiner—Meena Chelliah
Attorney, Agent, or Firm—Oblon, Spivak, McClelland, Maier & Neustadt

[57] ABSTRACT

A filtered venting system located in association with a reactor containment vessel installed in a reactor building comprises a filter device disposed in the reactor building and including filter means, a first venting line disposed on an upstream side of the filter device and having one end connected to the reactor containment vessel and another end connected to the filter device, a stand-by gas treatment system including outlet fan means or pump means and connected to the first venting line at the downstream side of the fan or pump means, and a second venting line disposed at a downstream side of the filter device and another end connected to an outlet means/ The filter device being utilized for the stand-by gas treatment system for treating and removing a radioactive substance contained in an atmosphere delivered from the reactor containment vessel.

7 Claims, 3 Drawing Sheets

FILTERED VENTING SYSTEM FOR REACTOR CONTAINMENT VESSEL OF NUCLEAR POWER PLANT

BACKGROUND OF THE INVENTION

The present invention relates to a filtered venting system for a reactor containment vessel of a nuclear power plant.

A boiling water type nuclear power plant is well known as one type of conventional nuclear power plant, and a typical example of the boiling water type nuclear power plant, hereinafter called BWR, is shown in FIG. 2. Referring to FIG. 2, a stand-by gas treatment system (SGTS) is installed in a reactor building 1, and this SGTS 2 operates, when a loss of coolant accident (LOCA) as design basis accident (DBA) occurs, to maintain a pressure inside the reactor building 1 to be negative by releasing an ambient atmosphere in the reactor building 1 into an external atmosphere gradually by a small amount and to thereby enclose radioactive substance leaking from the reactor containment vessel (RCV) within the reactor building 1, thus preventing the radioactive substance from being released into the environmental atmosphere.

Since the SGTS 2 is an equipment for a countermeasure to the LOCA as the DBA, the SGTS 2 is considered to be an engineered safety features, and accordingly, it is required for the SGTS 2 to apply a single accident standard or basis to dynamic equipment or mechanisms and to have an anti-earthquake design, which results in the requirement of a highly reliable design thereof.

The SGTS 2 for releasing the ambient atmosphere in the reactor building 1 is provided with an expensive filter train 4 with high performance for removing the radioactive substance in the ambient atmosphere. The filter train 4 includes in a row a pre-filter, a high efficiency particulate filter and a charcoal filter. The filter train 4 acts to sufficiently remove the radioactive substance from the exhausted atmosphere in the reactor building 1 fed by the operation of outlet or exhaust fans 5 and thereafter to discharge cleaned atmosphere including no radioactive substance into the external atmosphere through a stack 6. In the SGTS 2, an emergency a.c. power source such as emergency diesel generator (DG) is utilized for driving electrically operative valve means 7 for the outlet fans 5. In FIG. 2 reference numeral 8 denotes a moisture separator or remover, reference numeral 9 denotes a heating coil and reference character AO denotes an air operating valve.

Recently, in nuclear power plants installed in European countries, a filtered venting system 10 such as shown in FIG. 3 is provided in the reactor building 1 in consideration of an occurrence of a severe accident over the DBA.

The severe accident is an accident which occurs in an assumption of an extremely severe state such as in which the function of an external electric source is lost and all of the plurality of emergency a.c. power sources (DG) are also lost, and concretely, all of the a.c. power sources become entirely unusable, called an accident of loss of all a.c. power source. At the time of such a severe accident, before the inner pressure of the RCV 3 has increased extremely by decay heat generated by a nuclear fuel, a rapture disk 11 of the filtered venting system 10 is automatically operated to thereby discharge the atmosphere in the RCV 3 into the external atmosphere through the stack, thus preventing the RCV 3 from being damaged by the increased pressure.

The radioactive substance in the RCV 3 is removed by a filter vessel 12 equipped in the filtered venting system 10. The filter vessel 12 as a filtering device contains a water filter and a stainless filter, through which the radioactive substance contained in the inner atmosphere is fully removed and the atmosphere including substantially no radioactive substance is then discharged into the external atmosphere.

However, such a filtered venting system 10 has been designed to countermeasure a severe accident, which is a rare accident beyond the DBA, and therefore, it will be said that the design has not been made by specifically paying attention to the application of a single accident standard to a general dynamic equipment and to the assurance of the reliability of the system such as anti-earthquake design. Nevertheless, it is assumed that the accident of loss of all power source resulting in the severe accident is mainly caused with high possibility due to the earthquake, and in the prior art any redundant design or suitable countermeasure is not made in this view point. Accordingly, the described prior art system is not satisfactory in the reliability in an assumption of a case of a severe accident.

Furthermore, the filtered venting system for the severe accident such as shown in FIG. 3 is not designed to be automatically operated at the time of an occurrence of the severe accident. Thus, during steady operation of the reactor, it is necessary for an operator to open isolation valves 13, now being closed, in accordance with a personal judgement of the operator, and this involves much load to the operator. In this point of view, too, it will be said that the system shown in FIG. 3 is also not designed with high reliability. In FIG. 3, reference character L denotes a level meter.

On the contrary, as described hereinbefore, to the SGTS 2 for the design standard accidents designed for the DBA, the redundant design and the anti-earthquake design have been made to thereby automatically operate at an occurrence of the LOCA. In this view point, the SGTS may be said to have a design ensuring the sufficient reliability. However, the SGTS 2 requires the location of the a.c. power source for operating dynamic equipments such as outlet fans 5 and the electrically actuating valves 7, and accordingly, such system 2 cannot be operated at all at the severe accident caused by the accident of loss of all a.c. power source. For this reason, in spite of the provision of the expensive SGTS 2 for the DBA, in the European countries, an independent filtered venting system such as system 10 is additionally provided for the specific countermeasure to the severe accident, resulting in additional working and involving much cost. Moreover, since the filtered venting system is a system for the specific severe accidents, when it is intended to incorporate such filtered venting system 10 in the existing nuclear power plant, there is a fear of giving an erroneous understanding to the public such that the existing power plant is a type liable to cause such severe accident.

In the actual technology, the SGTS 2 is only used for the DBA and the filtered venting system 2 is only used for the severe accident, so that the additional application of the filtered venting system 10 to the SGTS 2 not only requires much additional cost but also gives the wrong understanding to the people.

Furthermore, since the filtered venting system 10 is a system for the specific severe accident and the reliability thereof is less than that of the SGTS 2, in actual, the introduction of the filtered venting system 10 applies much load to the operator, thus providing a problem.

SUMMARY OF THE INVENTION

The present invention conceived in consideration of the prior art of the characters described above and an object of the present invention is to provide a filtered venting system in association with a reactor containment vessel installed in a reactor building of a nuclear power plant, having the combined function of a stand-by gas treatment system and a filtered venting system for countermeasure to an occurrence of a design basis accident and a severe accident with highly improved reliability.

This and other objects can be achieved according to the present invention by providing a filtered venting system located in association with a reactor containment vessel installed in a reactor building comprising a filter device disposed in the reactor building and including filter means, a first venting line disposed on an upstream side of the filter device and having one end connected to the reactor containment vessel and another end connected to the filter device, a stand-by gas treatment system connected to the first venting line, and a second venting line disposed at a downstream side of the filter device and another end connected to an outlet means, wherein the filter device is utilized as filtering means for the stand-by gas treatment system for treating and removing a radioactive substance contained in an atmosphere delivered from the reactor containment vessel.

According to the filtered venting system of the structure described above, a filtered venting system for the severe accident is positively utilized. The first venting line is connected to the upstream side of the filter device and the downstream side of the outlet fans or pump means of the stand-by gas treatment system is connected to the first venting line to thereby utilize the filter device as filter means for removing the radioactive substance in the stand-by gas treatment system. Accordingly, it is made possible to eliminate a location of an expensive filter train utilized in a conventional system, thus remarkably decreasing cost.

Furthermore, the filtered venting system according to the present invention can be constructed as a single system having a combined function of the venting function of a filter venting system for countermeasure to a severe accident and a function of the stand-by gas treatment system, thus being effective.

DESCRIPTION OF THE PREFERRED EMBODIMENT

One preferred embodiment of the filtered venting system located in association with a reactor containment vessel according to the present invention will be described hereunder with reference to FIG. 1.

Figure 1:
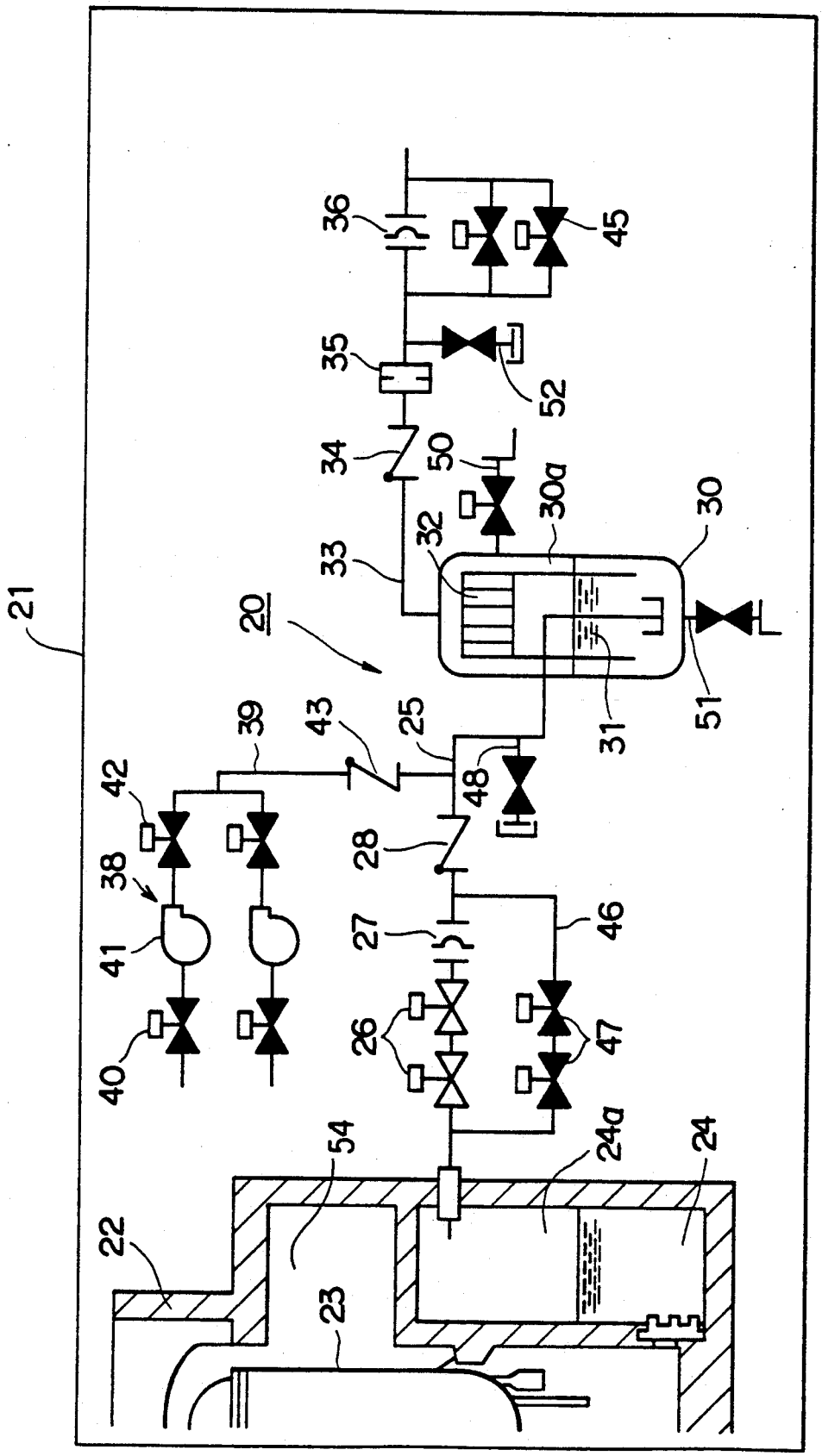
FIG. 1 is a system diagram of one embodiment of a filtered venting system for reactor containment vessel according to the present invention.
Figure 2:
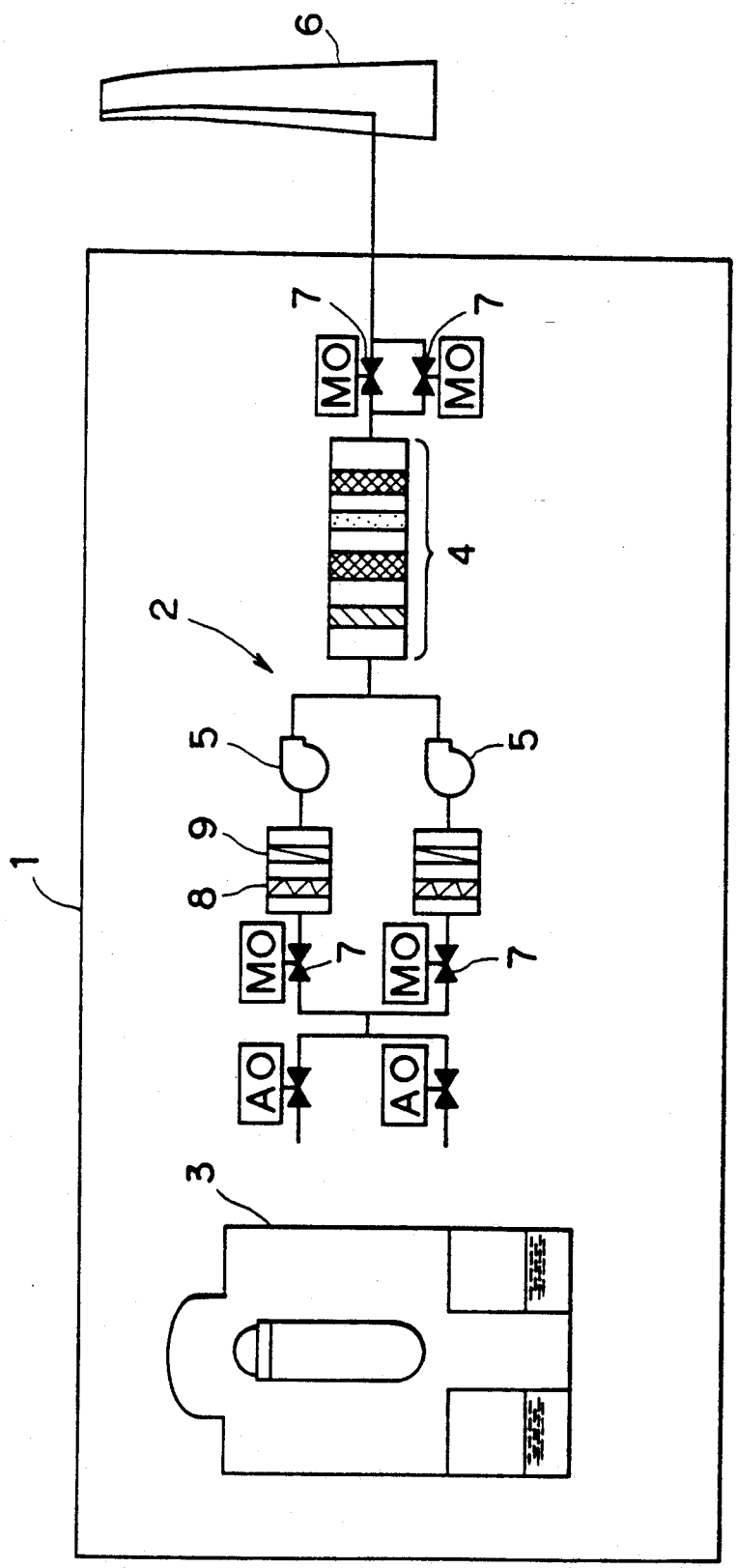
FIG. 2 is a system diagram showing a stand-by gas treatment system (SGTS) installed in a conventional boiling water reactor.
Figure 3:
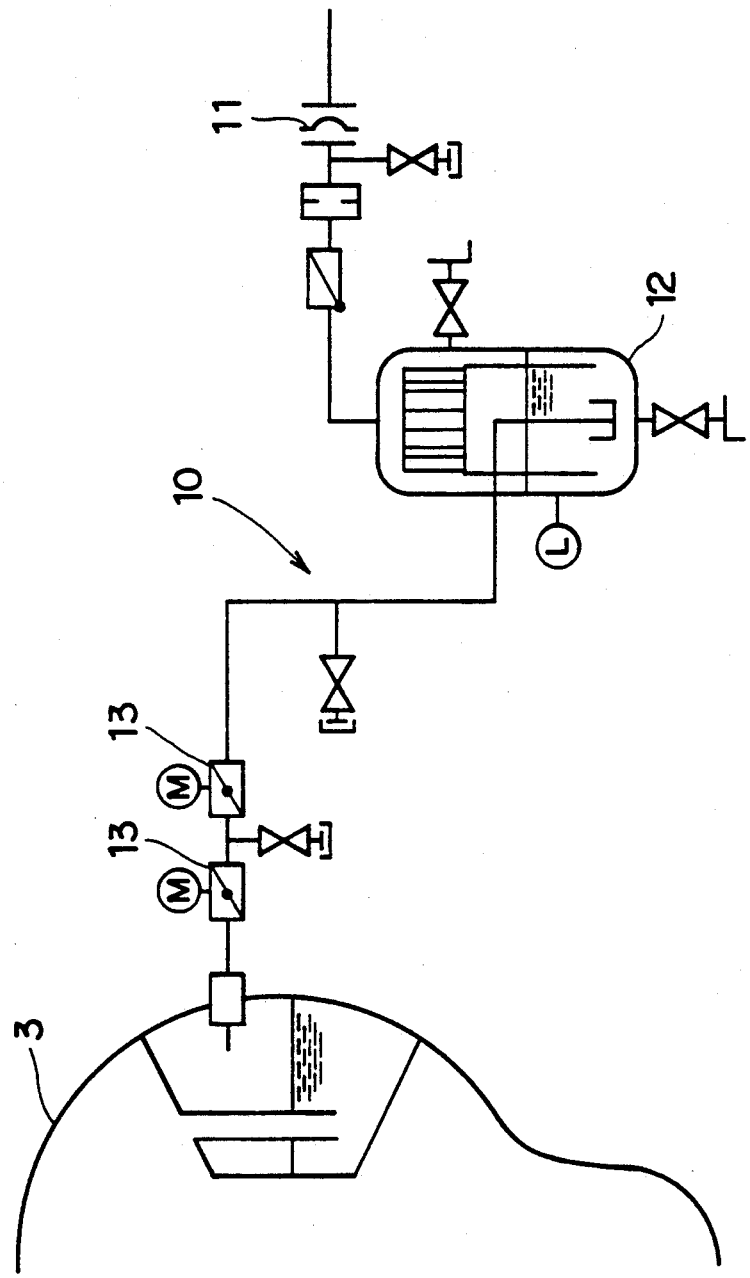
FIG. 3 is a system diagram showing one example of a conventional filtered venting system provided for a power plant in an European country.

Referring to FIG. 1, a filtered venting system 20 to countermeasure severe accidents is installed in a reactor building 21 of a light water reactor. In the reactor building 21, there is also installed a reactor containment vessel (RCV) 22, in which a reactor pressure vessel 23 is incorporated. A suppression pool 24 is arranged at a lower portion of the RCV 22 and the suppression pool 24 includes an gas chamber 24a to which a venting line 25 of the filtered venting system 20 is connected.

To the venting line 25 are incorporated in order isolation valves 26, 26, a rupture disk 27 and a check 30 constructed as a filtering device. In the filter vessel 30 there are disposed a water filter 31 and a stainless fiber filter 32. The filter vessel 30 has a top portion from which a venting line 33 of downstream side extends, and to the venting line 33 are incorporated in order a check valve 34, a pressure control throttle 35 and a rapture disk 36 as an assembly to be connected to a stack, not shown, through which the venting line 33 opens to the external atmosphere.

As described before, the venting line 25 disposed upstream side of the filter vessel 30 has one end communicated with the gas chamber 24a in the suppression pool 24 and the other end connected to the filter vessel 30. A line 39 of a stand-by gas treatment system (SGTS) 38, called hereinlater SGTS line 39, is connected at its one end to a portion of the venting line 25 disposed at the upstream side of the filter vessel 30. The SGTS line 39 has another end opened to an inner ambient atmosphere in the reactor building 21 and is equipped with at its intermediate portions in order, inlet or intake valves 40, outlet fans 41, isolation valves 42 and a check valve 43 all of the SGTS 38. Outlet valves 45 for the SGTS bypassing the rapture disk 36 are incorporated to the downstream side venting line 33. As described above, the stand-by gas treatment system (SGTS) 38 is integrated with the filtered venting system 20, thereby constituting an integrated filtered venting system as a single system.

A bypass circuit 46 bypassing the isolation valves 26 and the rupture disk 27 is incorporated to the venting line 25 disposed upstream side of the filter vessel 30, and isolation valves 47 are assembled with this bypass circuit 46 for the venting operation of an operator. Concretely, the isolation valves 47 are disposed for the purpose such that the operator carries out the venting operation before the inner pressure of the RCV 22 reaches an actuating pressure of the rupture disk 27 or the operator carries out a back-up operation in case of failure of the rupture disk operation. Redundancy or multiplicativeness is applied to the dynamic equipments, except for the check valves 28, 34 and 43 and the rupture disks 27 and 36, which have to be operated after the accident.

The filter vessel 30 includes a gas chamber 30a above the water filter 31, and an inert gas, preferably $N_2$ gas, supply line 48 is communicated with the gas chamber 30a to supply the inert gas thereinto. The interior of the filter vessel 30 is filled up with the inert gas such as $N_2$ during a reactor steady operation period by the supply of the $N_2$ gas from the feed line 48 for preventing burnable gas such as $H_2$ or CO gas contained in the atmosphere in the RCV 22 from burning in the filter vessel 30 after the accident.

Further, a filter means of a kind other than that mentioned above, such as a sand filter, may be disposed in the filter vessel 30 in substitution for the stainless fiber filter 32, but it is not necessarily required to always fill the interior of the filter vessel 30 with $N_2$ gas. In this case, it will be unnecessary to dispose the rapture disk 36 and the outlet valves 45 for the SGTS to the downstream side venting line 25. Furthermore, it may be possible to make redundant the check valve and the rapture disk for the improvement of the reliability of the system.

A water feed line 50 is connected to the filter vessel 30, and in FIG. 1, reference numerals 51 and 52 denote a drain line and a deaerator line, respectively.

The filtered venting system for the reactor containment vessel of the structure described above operates in the following manner.

If the DBA occurs in the light water reactor of a nuclear power plant, at least one series of DGs are provided to be operative, and accordingly, the outlet fans 41, the inlet valves 40, the isolation valves 42 and the outlet valves 45 of the SGTS 38 can be made operative by the operation of the DG.

Accordingly, the equipments such as outlet fans 41 start to operate automatically in response to a signal informing the detection of the occurrence of the DBA and the outlet fans 41 start to suck the ambient atmosphere in the reactor building 21. In this operation, since the outlet or exhaust line including the outlet fan or pump of the SGTS 38 according to this filtered venting system is connected to the venting line 25 disposed at the upstream side of the filter vessel 30 of the system 20, the sucked ambient atmosphere in the reactor building 21 is introduced into the filter vessel 30, in which the radioactive substance contained in the sucked atmosphere is then removed. The atmosphere cleaned by the filtering function of the filter vessel 30 is discharged externally into atmosphere through the stack, not shown. During this operation, the ambient atmosphere in the reactor building 21 is sucked from the SGTS 38 by the outlet fans 41 and then treated, so that the radioactive substance leaking at the DBA from the RCV 22 into the reactor building 21 can be prevented from further releasing into the external atmosphere, whereby the safeness to the public environment and people can be ensured.

On the contrary, when the severe accident occurs, it is considered that the all DGs become unusable. In such a case, all the dynamic equipments including the outlet fans 41 and the inlet valves 40 of the SGTS 38 will become inoperative. Further, since the dynamic systems including such as a core cooling system become also inoperative, the core is damaged and the radioactive substance is released from the damaged nuclear fuel, and hence, there causes a fear of releasing the radioactive substance into the RCV 22 and the inner pressure in the RCV 22 becomes high pressure due to the decay heat released by the nuclear fuel.

However, when the inner pressure reaches to a constant value, the rupture disk 27 operates to thereby deliver the atmosphere in the RCV 22 into the filter vessel 30 through the venting line 25. On the way of this flow of the atmosphere, the radioactive substance contained in the atmosphere of the RCV 22 can be fully removed in and by the filter vessel 30 and the cleaned atmosphere is then discharged into the environmental atmosphere through the stack. As described above, at the occurrence of the severe accident, the atmosphere in the RCV 22 can be automatically released into the environmental atmosphere in accordance with the increasing of the inner pressure in the RCV 22, so that any driving source such as a.c. power source for this purpose, whereby the pressure in the RCV 22 can be maintained to a value approximately of an atmospheric pressure and the soundness of the RCV 22 can thus be maintained. In the assumption of an occurrence of the severe accident, such a condition as that the radioactive substance is infinitively released into the environment can be preferably prevented, thus ensuring the safeness to the public.

Moreover, as described hereinbefore, according to the integrated filtered venting system 20, the radioactive substance can be removed by utilizing the same filter vessel 30 in an occurrence of the DBA as well as the severe accident for ensuring and maintaining the safeness to the public.

Furthermore, since the filtered venting system according to the present embodiment is provided with the safety function as the stand-by gas treating system essential to the occurrence of the DBA, the filtered venting system and, hence, the total power plant can be designed and installed as an engineered safety features in dependency on the safeness standard prescribed by a national standard with the high reliability and performance being maintained, whereby the reliability, such as redundant design or anti-earthquake design, of the venting function can be ensured at the occurrence of the severe accident.

In the described preferred embodiment, the venting line 25 of the filtered venting system 20 is connected to the gas chamber 24a in the suppression pool 24, the venting line 25 may be communicated with a drywell 54 defined in the RCV 22. Furthermore, many other changes or modifications for the arrangements of the outlet fans 41, the inlet valves 40, the isolation valves 42 and the line 39 for the SGTS 38 may be made according to the present invention, and for one example, the outlet fans 41 may be substituted with outlet pump means.

What is claimed is:

1. A filtered venting system located in association with a reactor containment vessel installed in a reactor building comprising:

a filter device disposed in the reactor building and including filter means;

a first venting line disposed on an upstream side of the filter device and having one end connected to the reactor containment vessel and another end connected to the filter device;

a stand-by gas treatment system connected to the first venting line, said stand-by gas treatment system including outlet drive means having a downstream side connected to the first venting line, inlet valve means, isolation valve means and check valve means; and a second venting line disposed at a downstream side of the filter device and having an end connected to discharge means;

wherein said filter device is utilized as filtering means for the stand-by gas treatment system for treating and removing a radioactive substance in an atmosphere delivered from the reactor containment vessel.

2. A filtered venting system according to claim 1, wherein said outlet drive means is an outlet fan means.

3. A filtered venting system according to claim 1, wherein said filter means includes a water filter and a stainless fiber filter.

4. A filtered venting system according to claim 1, wherein an inert gas feed line is connected to the filter device.

5. A filtered venting system according to claim 4, wherein the inert gas is an $N_2$ gas.

6. A filtered venting system according to claim 1, wherein isolation valve means, check valve means and rapture disk means are incorporated to the first venting line, and outlet valve means, rupture disk means and check valve means are incorporated to the second venting line.

7. A filtered venting system according to claim 1, wherein said outlet drive means is an outlet pump means.

* * * * *